United States Patent
Wang et al.

(10) Patent No.: US 7,329,716 B2
(45) Date of Patent: Feb. 12, 2008

(54) SILOXANE OLIGOMERS BY PHASE TRANSFER CATALYSIS

(75) Inventors: Hailiang Wang, Camarillo, CA (US); Zhibang Jim Duan, Newbury Park, CA (US); Satyabrata Raychaudhuri, Thousand Oaks, CA (US)

(73) Assignee: Yazaki Corporation, Tokyo (JP)

( * ) Notice: Subject to any disclaimer, the term of this patent is extended or adjusted under 35 U.S.C. 154(b) by 267 days.

(21) Appl. No.: 11/108,502

(22) Filed: Apr. 18, 2005

(65) Prior Publication Data

US 2006/0235179 A1    Oct. 19, 2006

(51) Int. Cl.
*C08G 77/08* (2006.01)

(52) U.S. Cl. .......................................... 528/21; 528/23

(58) Field of Classification Search .............. 528/21, 528/23

See application file for complete search history.

(56) References Cited

U.S. PATENT DOCUMENTS

| | | | | |
|---|---|---|---|---|
| 2,986,549 A | * | 5/1961 | McLoughlin | 524/300 |
| 4,101,513 A | * | 7/1978 | Fox et al. | 522/31 |
| 4,242,250 A | * | 12/1980 | Gagnon et al. | 524/817 |
| 4,891,398 A | * | 1/1990 | Tanaka et al. | 524/188 |
| 5,563,229 A | * | 10/1996 | Kawamoto et al. | 528/21 |
| 5,605,997 A | | 2/1997 | Yamamoto et al. | |
| 5,650,474 A | | 7/1997 | Yamaya et al. | |
| 6,043,330 A | * | 3/2000 | Hacker et al. | 528/12 |
| 6,069,259 A | | 5/2000 | Crivello | |
| 6,335,380 B1 | | 1/2002 | Wilhelm et al. | |
| 6,391,999 B1 | | 5/2002 | Crivello | |
| 6,871,418 B2 | | 6/2005 | Raychaudhuri et al. | |
| 6,962,727 B2 | * | 11/2005 | Bedwell et al. | 427/255.18 |
| 2002/0123592 A1 | * | 9/2002 | Zhang et al. | 528/10 |
| 2002/0137870 A1 | | 9/2002 | Crivello | |
| 2002/0160316 A1 | | 10/2002 | Richter et al. | |
| 2003/0189264 A1 | | 10/2003 | Jones et al. | |

FOREIGN PATENT DOCUMENTS

EP    0 505 737    9/1992

OTHER PUBLICATIONS

Page 950 "Silicones", Kirk-Othmer: Encylopedia of Chemical Technology, vol. 20, 1982.*
Arkles et al., "High Density Silicon Dioxide Coatings by UV and Thermal Processing," 2000, Silicones in Coatings III, Barcelona, Spain.
Arkles, "Commercial Applications of Sol-Gel-Derived Hybrid Materials," MRS Bulletin, 2001, pp. 402-408.
Arkles, "Silicon Esters," Encyclopedia of Chemical Technology, 1997, Fourth Edition, 22:69-81.
Baney et al., "Silsesquioxanes," Chem. Rev., 1995, 95:1409-1430.

* cited by examiner

*Primary Examiner*—Margaret G. Moore
(74) *Attorney, Agent, or Firm*—Fish & Richardson P.C.

(57) ABSTRACT

A process for forming a siloxane oligomer from a mixture comprising at least one alkoxysilane, at least one phase transfer catalyst having a specified structure, and water is described.

39 Claims, 1 Drawing Sheet

FIG. 1

SILOXANE OLIGOMERS BY PHASE TRANSFER CATALYSIS

TECHNICAL FIELD

This invention relates to siloxane oligomers, and more particularly to siloxane oligomers formed using a phase transfer catalyst.

BACKGROUND

Siloxane oligomers can be used for many purposes, including abrasion resistant coatings, antistatic coatings, hydrophobic coatings, non-stick release coatings, corrosion resistant coatings, optical coatings such as optical fiber coatings and anti-reflective coatings, optical waveguides, adhesives, composites, oils, encapsulants for semiconductors, and coupling agents to promote adhesion between organic and inorganic surfaces.

Siloxane oligomers have been prepared by hydrolysis of silicon alkoxides, resulting in the formation of silanol monomers. Condensation and polymerization reactions of silanol monomers yield the siloxane oligomers. The hydrolysis and condensation reactions are accelerated by acid catalysts such as HCl, $H_2SO_4$, HF or by base catalysts such as $NH_3$ or NaOH. In the absence of such catalysts, these reactions proceed very slowly. In addition, the functionality of the resulting oligomers may be impaired, as these catalysts can react with and degrade the functionality of the siloxane oligomers, as well as other functional groups present, during synthesis reactions.

SUMMARY

In one aspect, a process for forming a siloxane oligomer from a mixture including at least one alkoxysilane, at least one phase transfer catalyst, and water is featured. The phase transfer catalyst has a general structure represented by formula II:

where M is phosphorus or nitrogen, $R^4$, $R^5$, $R^6$, and $R^7$ are alkyl or aromatic groups, and $A^-$ is a counter ion, however when M is nitrogen, $A^-$ is not $F^-$.

Implementations may include one or more of the following features. For example, $A^-$ may not contain fluorine when M is nitrogen, or $A^-$ may not contain fluorine. In other implementations, $A^-$ may be $Cl^-$, $Br^-$, $OH^-$, $NO_3^-$, $COO^-$, $SO_4^{2-}$, $HSO_4^-$, $BF_4^-$, or $PF_6^-$. In other implementations, $A^-$ may be $Cl^-$, $Br^-$, $OH^-$, $NO_3^-$, $COO^-$, $SO_4^{2-}$, or $HSO_4^-$. Groups $R^4$, $R^5$, $R^6$, and $R^7$ may independently have from 1 to 10 carbon atoms, and be independently straight, branched, cyclic alkyl or aromatic groups.

The phase transfer catalyst may be selected from the group consisting of tricaprylylmethylammonium chloride, methyl tributyl ammonium chloride, tetrabutyl ammonium bromide, tetrabutyl ammonium hydrogen sulfate, triethyl benzyl ammonium chloride, tetrabutyl phosphonium bromide, tetrabutyl phosphonium chloride, tetraoctylphosphonium bromide, and mixtures thereof. Or, the phase transfer catalyst may be selected from the group consisting of tricaprylylmethylammonium chloride, tetrabutyl phosphonium bromide, tetrabutyl phosphonium chloride, tetraoctylphosphonium bromide, and mixtures thereof.

The phase transfer catalyst may be present in the mixture in an amount from about 0.0005 grams per gram of the alkoxysilane to about 0.2 grams per gram of the alkoxysilane. The phase transfer catalyst may be present in the mixture in an amount from about 0.001 grams per gram of the alkoxysilane to about 0.2 grams per gram of the alkoxysilane.

The alkoxysilane may have structure represented by formula (I):

where x equals 0, 1, 2 or 3, OR is a hydrolyzable alkoxy group, R is an alkyl group, and OFG is an organofunctional group.

Each R may independently have from 1 to 20 carbon atoms. Or, each R may independently have from 1 to 4 carbon atoms. Each OFG may independently have from 1 to 100 carbon atoms. Or, each OFG may independently have from 1 to 20 carbon atoms. Each OFG may independently include at least one functional group selected from the group consisting of epoxy, acrylate, methacrylate, amino, acetyl, cyano, halogen, mercapto, vinyl, alkoxyalkyl, carbamate, carboxyl, ester, aromatic, or alkyl (straight, branched, or cyclic) functional groups. Each OFG may have at least one carbon atom in addition to the functional group.

The alkoxysilane may be selected from the group consisting of (3-glycidoxypropyl)trimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, (3-methacryloxypropyl)trimethoxysilane, (3-methacryloxypropyl)triethoxysilane, (3-acryloxypropyl)trimethoxysilane, tetraethoxysilane, tetramethoxysilane, 3-aminopropyltrimethoxysilane, 3-aminopropyltriethoxysilane, acetoxypropyltrimethoxysilane, 3-cyanopropyltrimethoxysilane, (3,3,3-trifluoropropyl)trimethoxysilane, (tridecafluoro-1,1,2,2-tetrahydrooctyl)triethoxysilane, 3-mercaptopropyltrimethoxysilane, vinyltrimethoxysilane, vinyltriethoxysilane, and mixtures thereof.

The alkoxysilane may be selected from the group consisting of (3-glycidoxypropyl)trimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, (3-methacryloxypropyl)trimethoxysilane, (3-methacryloxypropyl)triethoxysilane, (3-acryloxypropyl)trimethoxysilane, and mixtures thereof.

The alkoxysilane may be selected from the group consisting of (3-glycidoxypropyl)trimethoxysilane, (3-methacryloxypropyl)trimethoxysilane, (3-methacryloxypropyl)triethoxysilane, and mixtures thereof.

Water may be present in the mixture in an amount from about 0.5 moles per mole of the alkoxysilane to about 20 moles per mole of the alkoxysilane. Water may be present in the mixture in an amount from about 0.5 moles per mole of the alkoxysilane to about 5 moles per mole of the alkoxysilane.

The mixture may also include a solvent. The solvent may be selected from the group consisting of ethanol, isopropanol, 1-methoxy-2-propanol, ethyl acetate, n-butylacetate, t-butylacetate, 2-propoxyethanol, propylene glycol monomethyl ether acetate, and mixtures thereof. The solvent may be isopropanol. The solvent may be present in the mixture in an amount at least about 0.01 moles per mole of the alkoxysilane, at least about 0.1 moles per mole of the alkoxysilane, or at least about 1 mole per mole of the alkoxysilane.

Forming a siloxane oligomer may continue for a period sufficient to hydrolyze at least 40 percent of all OR groups, at least 70 percent of all OR groups, or at least 80 percent of all OR groups. Forming a siloxane oligomer may continue for a period sufficient to form a siloxane oligomer with a weight average molecular weight from about 200 to about 100,000, from about 1,000 to about 50,000, or from about 2,000 to about 20,000.

To form the siloxane oligomer, the mixture may be heated at a temperature at or below the boiling point of the mixture at atmospheric pressure, from about 10° C. to about 150° C., from about 25° C. to about 80° C., or from about 50° C. to about 70° C.

The process may include purifying the siloxane oligomer. Purifying the siloxane oligomer may include separating a first liquid phase from a second liquid phase.

The details of one or more embodiments of the invention are set forth in the accompanying drawings and the description below. Other features, objects, and advantages of the invention will be apparent from the description and drawings, and from the claims.

DETAILED DESCRIPTION

Siloxane oligomers may be prepared by various processes including forming a siloxane oligomer from a mixture that may include an alkoxysilane, water, a phase transfer catalyst, and other components, such as a solvent.

One reaction component is an alkoxysilane. An alkoxysilane that is suitable for the preparation of the siloxane oligomers has general formula I:

$$(OFG)_{x}-Si-(OR)_{4-x} \quad \text{I}$$

wherein x equals 0, 1, 2 or 3;
OR is a hydrolyzable alkoxy group;
R is an alkyl; and
OFG is an organofunctional group.

In some embodiments, each OFG independently includes at least one functional group selected from the group consisting of epoxy, acrylate, methacrylate, amino, acetyl, cyano, halogen, mercapto, vinyl, alkoxyalkyl, carbamate, carboxyl, ester, aromatic, or alkyl (straight, branched, or cyclic) functional groups. In one embodiment, each OFG independently has from 1 to 100 carbon atoms. In another embodiment, each OFG independently has from 1 to 20 carbon atoms. Each OFG may have at least one carbon atom in addition to the functional group.

In some embodiments, each alkyl group R independently has from 1 to 20 carbon atoms. In other embodiments, each alkyl group R independently has from 1 to 4 carbon atoms.

OFG groups such as epoxy, acrylate, methacrylate, and vinyl groups provide additional polymerizable functionality to the siloxane oligomers. In the presence of a suitable catalyst and thermal or actinic radiation, the siloxane oligomers with such polymerizable groups can polymerize to yield very hard abrasion resistant coatings. Organic groups with fluorine and alkyl functionalities can provide hydrophobic non-adhesive properties to the siloxane oligomers or polymers. Siloxane oligomers or polymers with various organofunctional groups such as amino, mercapto, and cyano groups can be used as coupling agents for adhesion of non-organic articles with organic articles as described by Edwin Plueddemann in "Silane Coupling Agents, 2 Edition", published by Plenum Press in New York, 1991.

Examples of suitable alkoxysilanes with epoxy functionalities include (3-glycidoxypropyl)trimethoxysilane, (3-glycidoxypropyl)dimethylmethoxysilane, (3-glycidoxypropyl) dimethylethoxysilane, (3-glycidoxypropyl) methyldiethoxysilane, (3-glycidoxypropyl) methyldimethoxysilane, 2-(3,4-epoxycyclohexyl) ethyltrimethoxysilane, 2-(3,4-epoxycyclohexyl) ethyltriethoxysilane, 5,6-epoxyhexyltriethoxysilane, mixtures thereof, and the like.

Examples of suitable alkoxysilanes with acrylate or methacrylate functionalities include (3-methacryloxypropyl)trimethoxysilane, (3-methacryloxypropyl)triethoxysilane, (3-acryloxypropyl)trimethoxysilane, (3-acryloxypropyl) methlyldimethoxysilane, (3-acryloxypropyl)dimethylmethoxysilane, (methacryloxymethyl)dimethylethoxysilane, methacryloxymethyltrimethoxysilane, methacryloxymethyltriethoxysilane, mixtures thereof, and the like.

Examples of suitable alkoxysilanes with amino functional groups include 3-aminopropyltrimethoxysilane, 3-aminopropyltriethoxysilane, 3-aminopropyldimethylethoxysilane, 3-aminopropylmethyldiethoxysilane, 3-aminopropyltris (methoxyethoxyethoxy)silane, 4-aminobutyltriethoxysilane, N-methylaminopropylmethyldimethoxysilane, N-methylaminopropyltrimethoxysilane, 3-(N-allylamino)propyltrimethoxysilane, N-(2-aminoethyl)-3-aminopropyltrimethoxysilane, (N,N-diethyl-3-aminopropyl)trimethoxysilane, N-(6-aminohexyl)aminopropyltrimethoxysilane, 3-(m-aminophenoxy)propyltrimethoxysilane, aminophenyltrimethoxysilane, m-aminophenyltrimethoxysilane, p-aminophenyltrimethoxysilane, 4-2(2-aminoethylaminomethyl) phenethyltrimethoxysilane, (aminoethylaminomethyl) phenethyltrimethoxysilane, mixtures thereof, and the like.

Examples of suitable alkoxysilanes with acetyl functional groups include acetoxymethyltriethoxysilane, acetoxymethyltrimethoxysilane, acetoxypropyltrimethoxysilane, mixtures thereof, and the like.

Examples of suitable alkoxysilanes with cyano functional groups include 2-cyanoethyltrimethoxysilane, 2-cyanoethyltriethoxysilane, 3-cyanopropyltrimethoxysilane, 3-cyanopropylmethyldimethoxysilane, 3-isocyanopropyltrimethoxysilane, 3-cyanopropyltrimethoxysilane, 3-cyanopropyltriethoxysilane, bis(3-cyanopropyl)dimethoxysilane, mixtures thereof, and the like.

Examples of suitable alkoxysilanes with halogen functional groups include 3-bromopropyltrimethoxysilane, 3-chloropropyltrimethoxysilane, 3-chloroethyltrimethoxysilane, 2-chloroethyltriethoxysilane, 3-chloropropyltriethoxysilane, chloromethyltriethoxysilane, chloromethyltrimethoxysilane, 2-(4-chlorosulfonylphenyl) ethyltrimethoxysilane, (3,3,3-trifluoropropyl) trimethoxysilane, (tridecafluoro-1,1,2,2-tetrahydrooctyl) triethoxysilane, (heptadecafluoro-1,1,2,2- tetrahydrododecyl)triethoxysilane, pentafluorophenylpropyltrimethoxysilane, 11-bromoundecyltrimethoxysilane, chloromethylmethyldiethoxysilane, chloromethylmethyldiisopropoxysilane, ((chloromethyl)phenylethyl)-trimethoxysilane, p-chloromethylphenyltrimethoxysilane, p-chloromethylphenyltriisopropylsilane, 3-iodopropyltrimethoxysilane, mixtures thereof, and the like.

Examples of suitable alkoxysilanes with mercapto functional groups include 3-mercaptopropyltrimethoxysilane, 3-mercaptopropyltriethoxysilane, 3-mercaptomethylmethyldiethoxysilane, 3-mercaptopropylmethyldimethoxysilane, mercaptomethylmethyldiethoxysilane, mixtures thereof, and the like.

Examples of suitable alkoxysilanes with vinyl functional groups include butenyltriethoxysilane, vinyltrimethoxysilane, vinyltriethoxysilane, vinyltrisopropoxysilane, allyldimethoxysilane, allyltrimethoxysilane, allyltriethoxysilane, [2-(3-cyclohexenyl)ethyl]trimethoxysilane, [2-(3-cyclohexenyl)ethyl]triethoxysilane, 3-(N-allylamino)propyltrimethoxysilane, 2-(chloromethyl)allyltrimethoxysilane, 5-(bicycloheptenyl)triethoxysilane, mixtures thereof, and the like.

Examples of suitable alkoxysilanes with aromatic functional groups include phenethyltrimethoxysilane, phenyltrimethoxysilane, benzyltriethoxysilane, phenyltriethoxysilane, mixtures thereof, and the like.

Examples of suitable alkoxysilanes with alkyl functional groups include methyltrimethoxysilane, ethyltrimethoxysilane, propyltrimethoxysilane, butyltrimethoxysilane, isobutyltrimethoxysilane, n-butyltrimethoxysilane, hexyltrimethoxysilane, hexadecyltrimethoxysilane, octyltrimethoxysilane, isoctyltrimethoxysilane, decyltrimethoxysilane, allyltrimethoxysilane, cyclohexyltrimethoxysilane, cyclohexylmethyltrimethoxysilane, 2-(3-cyclohexenyl)ethyltrimethoxysilane, cyclopentyltrimethoxysilane, methyltriethoxysilane, ethyltriethoxysilane, propyltriethoxysilane, butyltriethoxysilane, isobutyltriethoxysilane, hexyltriethoxysilane, pentyltriethoxysilane, octyltriethoxysilane, cyclohexyltriethoxysilane, n-decyltriethoxysilane, dodecyltriethoxysilane, cyclohexylmethyltriethoxysilane, dimethyldimethoxysilane, diethyldiethoxysilane, mixtures thereof, and the like.

Examples of suitable alkoxysilanes with alkoxyalkyl functional groups include 3-methoxypropyltrimethoxysilane, 3-ethoxypropyltrimethoxysilane, 3-propxypropyltrimethoxysilane, 3-methoxyethyltrimethoxysilane, 3-ethoxyethyltrimethoxysilane, 3-propoxyethyltrimethoxysilane, 2-[methoxy(polethyleneoxy)propyl]heptamethyltrisiloxane, [methoxy(polyethyleneoxy)propyl]trimethoxysilane, [methoxy(polyethyleneoxy)ethyl]trimethoxysilane, [methoxy(polyethyleneoxy)ethyl]triethoxysilane, [methoxy(polyethyleneoxy)ethyl]trimethoxysilane, mixtures thereof and the like.

Examples of suitable alkoxysilanes with four hydrolyzable alkoxy groups include tetramethoxysilane, tetraethoxysilane, tetrapropoxysilane, tetraisopropoxysilane, tetrabutoxysilane, tetraisobutoxysilane, tetrakis(methoxyethoxy)silane, tetrakis(methoxypropoxy)silane, tetrakis(ethoxyethoxy)silane, tetrakis(methoxyethoxyethoxy)silane, tri(methoxyethoxy)silane, dimethoxydiethoxysilane, triethoxyrnethoxysilane, mixtures thereof, and the like.

Particularly useful alkoxysilanes include (3-glycidoxypropyl)trimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, (3-methacryloxypropyl)trimethoxysilane, (3-methacryloxypropyl)triethoxysilane, (3-acryloxypropyl)trimethoxysilane, methacryloxymethyltrimethoxysilane, methacryloxymethyltriethoxysilane, tetraethoxysilane, tetramethoxysilane, 3-aminopropyltrimethoxysilane, 3-aminopropyltris(methoxyethoxyethoxy)silane, 3-aminopropylmethyldiethoxysilane, 3-aminopropyldimethylethoxysilane, 3-aminopropyltriethoxysilane, 3-(N-allylamino)propyltrimethoxysilane, N-(2-aminoethyl)-3-aminopropyltrimethoxysilane, acetoxypropyltrimethoxysilane, 2-cyanoethyltriethoxysilane, 3-cyanopropyltrimethoxysilane, (3,3,3-trifluoropropyl)trimethoxysilane, (tridecafluoro-1,1,2,2-tetrahydrooctyl)triethoxysilane, (heptadecafluoro-1,1,2,2-tetrahydrododecyl)triethoxysilane, 3-mercaptopropyltrimethoxysilane, vinyltrimethoxysilane, vinyltriethoxysilane, and mixtures thereof.

Especially suitable and useful alkoxysilanes include (3-glycidoxypropyl)trimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, (3-methacryloxypropyl)trimethoxysilane, (3-methacryloxypropyl)triethoxysilane, (3-acryloxypropyl)trimethoxysilane, tetraethoxysilane, tetramethoxysilane, 3-aminopropyltrimethoxysilane, 3-aminopropyltriethoxysilane, acetoxypropyltrimethoxysilane, 3-cyanopropyltrimethoxysilane, (3,3,3-trifluoropropyl)trimethoxysilane, (tridecafluoro-1,1,2,2-tetrahydrooctyl)triethoxysilane, 3-mercaptopropyltrimethoxysilane, vinyltrimethoxysilane, vinyltriethoxysilane, and mixtures thereof.

In another embodiment, especially suitable and useful alkoxysilanes include (3-glycidoxypropyl)trimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, (3-methacryloxypropyl)trimethoxysilane, (3-methacryloxypropyl)triethoxysilane, (3-acryloxypropyl)trimethoxysilane and mixtures thereof.

In yet another embodiment, especially suitable and useful alkoxysilanes include (3-glycidoxypropyl)trimethoxysilane, (3-methacryloxypropyl)trimethoxysilane, (3-methacryloxypropyl)triethoxysilane, and mixtures thereof.

Another reaction component is a phase transfer catalyst. Phase transfer catalysts are preferred for the hydrolysis and condensation of alkoxysilane monomers. Using a phase transfer catalyst in the reaction enables the alkoxy (OR) groups of the alkoxysilanes to be hydrolyzed with minimal or no damage to the organofunctional groups (OFG) of the alkoxysilanes. Thus, the resulting siloxane oligomers have very good functionality and can be rapidly cured.

The phase transfer catalyst, which is suitable for preparation of the siloxane oligomers has general formula II:

II wherein M is phosphorus or nitrogen;

$R^4$, $R^5$, $R^6$, and $R^7$ are alkyl or aromatic groups; and $A^-$ is a counter ion.

$R^4$, $R^5$, $R^6$, and $R^7$ are each independently straight, branched, cyclic alkyl groups or aromatic groups, and may be the same or different. In various embodiments, groups $R^4$, $R^5$, $R^6$, and $R^7$ each independently have from 1 to 10 carbon atoms.

In one embodiment, A⁻ is Cl⁻, Br⁻, OH⁻, NO₃⁻, COO⁻, SO₄²⁻, HSO₄⁻, BF₄⁻, or PF₆⁻. In another embodiment, A⁻ is Cl⁻ or Br⁻. In some embodiments, A⁻ is a counter ion excluding F⁻. In other embodiments, A⁻ is a counter ion with the proviso that A does not contain fluorine.

Examples of suitable phase transfer catalysts include benzyl tributyl ammonium bromide, benzyl tributyl ammonium chloride, benzyl triethyl ammonium bromide, benzyl triethyl ammonium chloride, benzyl trimethyl ammonium chloride, cetyl pyridinium bromide, cetyl pyridinium chloride, cetyl trimethyl ammonium bromide, didecyl dimethyl ammonium chloride, dimethyl distearyl ammonium bisulfate, dimethyl distearyl ammonium methosulfate, dodecyl trimethyl ammonium bromide, dodecyl trimethyl ammonium chloride, methyl tributyl ammonium chloride, methyl tributyl ammonium hydrogen sulfate, tricaprylylmethylammonium chloride (ALIQUAT® 336), methyl tributyl ammonium chloride (ALIQUAT® 175), methyl trioctyl ammonium chloride, myristyl trimethyl ammonium bromide, phenyl trimethyl ammonium chloride, tetrabutyl ammonium borohydride, tetrabutyl ammonium bromide (ALIQUAT® 100), tetrabutyl ammonium chloride, tetrabutyl ammonium hydrogen sulfate, tetrabutyl ammonium hydroxide, tetrabutyl ammonium iodide, tetrabutyl ammonium perchlorate, tetraethyl ammonium bromide, tetraethyl ammonium chloride, tetraethyl ammonium hydroxide, tetrahexyl ammonium bromide, tetrahexyl ammonium iodide, tetramethyl ammonium bromide, tetramethyl ammonium chloride, tetramethyl ammonium hydroxide, tetramethyl ammonium iodide, tetraoctyl ammonium bromide, tetrapropyl ammonium bromide, tetrapropyl ammonium chloride, tetrapropyl ammonium hydroxide, tributyl methyl ammonium chloride, triethyl benzyl ammonium chloride, benzyl triphenyl phosphonium bromide, benzyl triphenyl phosphonium chloride, butyl triphenyl phosphonium bromide, butyl triphenyl phosphonium chloride, ethyl triphenyl phosphonium acetate, ethyl triphenyl phosphonium bromide, ethyl triphenyl phosphonium iodide, methyl triphenyl phosphonium bromide, tetrabutyl phosphonium bromide, tetraphenyl phosphonium bromide, tetrabutyl phosphonium chloride, tetraoctylphosphonium bromide, and mixtures thereof.

Particularly useful phase transfer catalysts include tricaprylylmethylammonium chloride (ALIQUAT® 336), methyl tributyl ammonium chloride (ALIQUAT® 175), tetrabutyl ammonium bromide (ALIQUAT® 100), tetrabutyl ammonium hydrogen sulfate, triethyl benzyl ammonium chloride, tetrabutyl phosphonium bromide, tetrabutyl phosphonium chloride, tetraoctylphosphonium bromide, and mixtures thereof.

Especially suitable and useful phase transfer catalysts include tricaprylylmethylammonium chloride (ALIQUAT® 336), tetrabutyl phosphonium bromide, tetrabutyl phosphonium chloride, tetraoctylphosphonium bromide, and mixtures thereof.

In one embodiment the amount of the phase transfer catalyst used in preparation of the siloxane oligomers is at least 0.0005 grams per gram of alkoxysilane, or at least 0.001 grams per gram of alkoxysilane. In another embodiment, the amount of the phase transfer catalyst may be up to 0.2 grams per gram of alkoxysilane.

Water is another reaction component. In one embodiment, the amount of water used in preparation of the siloxane oligomers is at least about 0.5 moles per mole of alkoxysilane. In other embodiments, the amount of water present may be up to about 20 moles of water per mole of alkoxysilane, or up to about 5 moles of water per mole of alkoxysilane.

The reaction may be carried out without additional solvent. Optionally, however, a solvent may also be used in the reaction. Alkoxysilanes are typically immiscible with water. Therefore, the reaction between alkoxysilane and water proceeds slowly. Therefore, a solvent that is miscible with water, alkoxysilane, and the phase transfer catalyst can be used to increase the rate of the reaction. In one aspect, at least one solvent that is miscible with water, alkoxysilane, and the phase transfer catalyst but not miscible with the oligomer is used to increase the rate of reaction and to easily separate the oligomer from the alkoxysilane, water, the phase transfer catalyst, and/or the solvent. Solvents that may be used include alcohols, glycols, ethers, glycol ethers, ketones, esters, glycolether acetates, and mixtures thereof.

Suitable solvents include methanol, ethanol, propanol, isopropanol, butanol, isobutanol, secondary butanol, tertiary butanol, cyclohexanol, pentanol, octanol, decanol, di-n-butylether, ethylene glycol dimethyl ether, propylene glycol dimethyl ether, propylene glycol methyl ether, dipropylene glycol methyl ether, tripropylene glycol methyl ether, dipropylene glycol dimethyl ether, tripropylene glycol dimethyl ether, ethylene glycol butyl ether, diethylene glycol butyl ether, ethylene glycol dibutyl ether, ethylene glycol methyl ether, diethylene glycol ethyl ether, diethylene glycol dimethyl ether, ethylene glycol ethyl ether, ethylene glycol diethyl ether, ethylene glycol, diethylene glycol, triethylene glycol, propylene glycol, dipropylene glycol, tripropylene glycol, butylene glycol, dibutylene glycol, tributylene glycol, tetrahydrofuran, dioxane, acetone, diacetone alcohol, methyl ethyl ketone, cyclohexanone, methyl isobutyl ketone, ethyl acetate, n-propyl acetate, n-butyl acetate, t-butyl acetate, propylene glycol monomethyl ether acetate, dipropylene glycol methyl ether acetate, 1-methoxy-2-propanol, ethyl 3-ethoxypropionate, 2-propoxyethanol, ethylene glycol ethyl ether acetate, and mixtures thereof.

Particularly useful solvents include ethanol, isopropanol, 1-methoxy-2-propanol, ethyl acetate, n-butyl acetate, t-butyl acetate, 2-propoxyethanol, propylene glycol monomethyl ether acetate, and mixtures thereof. Another particularly useful solvent is isopropanol.

One or more solvents may be used in various amounts to assist in obtaining desired reaction conditions. The amount of solvent used in preparation of the siloxane oligomers may be at least 0.01 moles per mole of the alkoxysilane, at least 0.1 moles per mole of the alkoxysilane, or at least 1 mole per mole of the alkoxysilane.

The reaction may be carried out at a range of temperatures. Preferably, the reaction will be carried out at a temperature that maximizes the reaction rate and minimizes the formation of side products. In one embodiment, the reaction is carried out at a temperature at or below the boiling point of the reaction mixture at atmospheric pressure. In various embodiments, the reaction temperature may be greater than about 10° C., greater than about 15° C., greater than about 25° C., greater than about 50° C., or greater than about 60° C. The reaction temperature may be less than about 150° C., less than about 100° C., less than about 80° C., or less than about 70° C.

The reaction may be conducted for a sufficient period of time to hydrolyze some, most, nearly all, or all of the alkoxysilane (Si—OR) groups, as defined in formula I. For example, the reaction may be continued for a period sufficient to hydrolyze at least 40 percent of all alkoxysilane groups, may be continued for a period sufficient to hydrolyze at least 70 percent of all alkoxysilane groups, may be continued for a period sufficient to hydrolyze at least 80 percent of all alkoxysilane groups, or may be continued for a period sufficient to hydrolyze at least 90 percent of all alkoxysilane groups. The extent of this conversion can be determined by following alkoxy group peak reduction (such as methoxy groups for methoxysilanes) using $^1$H-NMR (Nuclear Magnetic Resonance) spectroscopy.

The reaction may be continued for a sufficient period of time to obtain a siloxane oligomer with a weight average molecular weight in the range of 200 to 100,000. In various embodiments, the reaction may be continued for a sufficient period of time to obtain a siloxane oligomer with a weight average molecular weight equal to or greater than 1,000, or equal to or greater than 2,000. The reaction may be continued for a sufficient period of time to obtain a siloxane oligomer with a weight average molecular weight equal to or less than 50,000, or equal to or less than 20,000. The molecular weight of the siloxane oligomer may be determined using gel permeation chromatography (GPC). A suitable instrument for performing this analysis is model 2695 Separations Module equipped with model 2414 Refractive index detector, and three Styragel columns (models HR3, HR1, and HR0.5). The module, detector, and all three columns are manufactured by Waters Corporation (Connecticut, U.S.A.). The weight average molecular weight of the siloxane oligomer is determined relative to polystyrene standards purchased from Aldrich (Milwaukee, Wis.) under a catalog number 32,783-2. A ~0.1 wt % solution of the samples in THF is used for the GPC analyses. The siloxane oligomer may compose of oligomers of wide range of molecular weights. The oligomers that have a molecular weight of at least about 50 are included in calculations of the weight average molecular weight of the siloxane oligomer. The smaller molecular weight oligomers that may appear in the chromatogram are excluded from the calculations.

The reaction may be stopped after a sufficient period of time by using various methods. For example, the reaction may be stopped by removing the phase transfer catalyst from the reaction mixture. The phase transfer catalyst may be removed by suitable methods, including for example, by extraction using a different solvent, or by adsorption using active carbon or ion exchange resin. As the siloxane oligomer may have limited solubility in the reaction mixture, the phase transfer catalyst can also be removed by phase separation. If the reaction is carried out at sufficiently low temperatures, the phase separation of the oligomer from the phase transfer catalysts occurs during the reaction. The reaction may also be stopped by addition of agents suitable for end-capping of silanol groups known in the polymer synthesis art. The reaction may also be stopped by cooling down the reaction mixture below the reaction temperature, for example at least 5° C. below the reaction temperature, at least 10° C. below the reaction temperature, or at least 20° C. below the reaction temperature.

Abrasion resistant coatings may be produced using a composition comprising raw or purified siloxane oligomer. After the siloxane oligomer formation reaction is stopped, the formed siloxane oligomer is obtained in the reaction mixture. At this stage, the reaction mixture may also comprise other reaction components such as water, the phase transfer catalyst, the solvent, and/or reaction byproducts such as alcohol, low molecular weight siloxanes in the form of dimers, trimers, etc. At this raw stage, the reaction mixture may be in one phase or separated into more than one phase. One of these liquid phases may contain the formed siloxane oligomer more in quantity than the other. This reaction mixture that contains the formed siloxane oligomer, whether it is in one liquid phase or more than one liquid phase, may be used for preparation of the coating composition.

The formed siloxane oligomer may also be used for the preparation of the coating composition after it is purified by separating it from other components of the reaction mixture by using various well-known methods. For example, the volatile components such as water or the solvent may be partially or essentially completely removed from the reaction mixture by evaporation. If there are more than one liquid phase after the reaction is stopped, the phase richer in quantity of the formed siloxane oligomer may be separated by a separation funnel and then can be used. The phase separation of the reaction mixture may also be obtained by cooling down the reaction mixture or adding a suitable solvent. After the oligomer rich phase is separated, the residual solvent can further be evaporated. The phase transfer catalyst may be removed from the reaction mixture by extraction using a different solvent, or by adsorption using active carbon or ion exchange resin. The formed siloxane oligomer may be used for the preparation of the coating composition at any partially or essentially completely purified level.

To determine the amount of the formed siloxane oligomer, a sample is taken from the reaction mixture or from the purified mixture. The volatile components are then evaporated from this sample until the weight change of the sample becomes essentially negligible. This sample is then analyzed by using $^1$H-NMR (Nuclear Magnetic Resonance) spectroscopy and/or GPC (Gel Permeation Chromatography) to determine the amount of impurities present together with the formed siloxane oligomer. These impurities may include the phase transfer catalyst, the residual solvent, and low molecular weight siloxanes in the form of dimers, trimers, etc.

Aspects of the invention will be further described by the following illustrative examples which do not limit the scope of the invention described herein.

EXAMPLE 1

A siloxane oligomer was prepared according to the following procedure. In a one liter flask, 499.8 grams (2.12 mole) of (3-glycidoxypropyl)trimethoxysilane (GPTMOS) (available from Gelest, Inc., Morrisville, Pa.), 131.4 grams (2.18 mole) of isopropanol, 57.2 grams of deionized water (3.17 mole), and 2.5 grams of a phase transfer catalyst, tricaprylylmethylammonium chloride (ALIQUAT® 336, available from Sigma Aldrich, St. Louis, Mo.) were mixed and reacted by heating at about 60° C. After about 4 hours of heating, the mixture was cooled to about 22° C., and the mixture formed two liquid phases. The bottom liquid phase was separated using a separatory funnel.

The bottom liquid was then analyzed by a single pulse $^1$H-NMR (Nuclear Magnetic Resonance) spectroscopy, using model Eclipse 400+ (JEOL Corporation, Japan). Acetone $d_6$ was used as a solvent for the analysis. The NMR spectra obtained was: $^1$H-NMR (400 MHz) δ (ppm): 0.747 (s, b, 2H, SiCH$_2$CH$_2$), 1.728 (s, b, 2H, SiCH$_2$CH$_2$CH$_2$), 2.531 (m, b, 1H, CHOCHH), 2.700 (m, b, 1H, CHOCHH), 3.077 (s, b, CHOCH$_2$), 3.292 (m, b, 1H, OCHHCHOCH$_2$), 3.487 (m, b, 2H, SiCH$_2$CH$_2$CH$_2$), 3.709 (m, b, 1H, OCHHCHOCH$_2$). This analysis determined that the bottom liquid phase was essentially a siloxane oligomer. This siloxane oligomer contained essentially negligible amount of the phase transfer catalyst.

A GPC analysis of the bottom liquid phase determined that the weight average molecular weight of the oligomer was about 15,059.

EXAMPLE 2

In a one liter flask, 500.2 grams of GPTMOS, 131.4 grams of isopropanol, 57.1 grams of deionized water, and 2.5 grams of a phase transfer catalyst, ALIQUAT® 336, were mixed and reacted at about 22° C. After about 29 hours of mixing, the mixture formed two liquid phases, and the bottom liquid phase was separated using a separatory funnel.

This liquid was analyzed as described in Example 1. The NMR spectra obtained was: $^1$H-NMR (400 MHz) NMR (400 MHz) δ (ppm): 0.746 (s, b, 2H, SiCH$_2$CH$_2$), 1.725 (s, b, 2H, SiCH$_2$CH$_2$CH$_2$), 2.529 (m, b, 1H, CHOCHH), 2.705 (m, b, 1H, CHOCHH), 3.076 (s, b, CHOCH$_2$), 3.297 (s, b, 1H, OCHHCHOCH$_2$), 3.482 (m, b, 2H, SiCH$_2$CH$_2$CH$_2$), 3.711 (m, b, 1H, OCHHCHOCH$_2$). This analysis determined that the bottom liquid phase was essentially a siloxane oligomer. This siloxane oligomer contained essentially negligible amount of the phase transfer catalyst. A GPC analysis determined that the weight average molecular weight of the oligomer was about 6015.

EXAMPLE 3

In a one liter flask, 700.5 grams of GPTMOS, 183.7 grams of isopropanol, 80.1 grams of deionized water, and 3.5 grams of a phase transfer catalyst, tetrabutyl phosphonium bromide (TBPB, available from Sigma Aldrich, St. Louis, Mo.) were mixed and reacted at about 22° C. After about 22 hours of reaction time, the mixture formed two liquid phases, and the bottom liquid phase was separated using a separatory funnel.

This liquid was analyzed as described in Example 1. The NMR spectra obtained was: $^1$H-NMR (400 MHz) NMR (400 MHz) δ (ppm): 0.735 (s, b, 2H, SiCH$_2$CH$_2$), 1.722 (s, b, 2H, SiCH$_2$CH$_2$CH$_2$), 2.521 (m, b, 1H, CHOCHH), 2.699 (m, b, 1H, CHOCHH), 3.069 (s, b, CHOCH$_2$), 3.296 (s, b, 1H, OCHHCHOCH$_2$), 3.474 (m, b, 2H, SiCH$_2$CH$_2$CH$_2$), 3.698 (m, b, 1H, OCHHCHOCH$_2$). This analysis determined that the bottom liquid phase was essentially a siloxane oligomer. This siloxane oligomer contained essentially negligible amount of the phase transfer catalyst. A GPC analysis determined that the weight average molecular weight of the oligomer was about 5735.

EXAMPLE 4

In a 25-ml flask, 10 grams of GPTMOS, 2.62 grams of isopropanol, 1.14 grams of deionized water, and 0.05 grams of a phase transfer catalyst, TBPB are mixed and reacted by heating at about 60° C. After heating for a predetermined time, the mixture is cooled down to about 22° C. to form two liquid phases. The bottom liquid phase is separated using a separation funnel.

This liquid may be analyzed in the same manner as described in Example 1. It is expected that the oligomer prepared after about 4 hours of reaction time will have a weight average molecular weight of about 5565. The oligomer prepared after 24 hours of reaction time has an expected weight average molecular weight of about 9923. The following spectra are expected to be obtained for the oligomer produced after about 24 hours of reaction time: $^1$H-NMR (400 MHz) δ (ppm): 0.734 (s, b, 2H, SiCH$_2$CH$_2$), 1.729 (s, b 2H, SiCH$_2$CH$_2$CH$_2$), 2.532 (m, b, 1H, CHOCHH), 2.712 (s, b, 1H, CHOCHH), 3.084 (s, b, CHOCH$_2$), 3.288 (m, b, 1H, OCHHCHOCH$_2$), 3.488 (m, b, 2H, SiCH$_2$CH$_2$CH$_2$), 3.712 (m, b, 1H, OCHHCHOCH$_2$). This analysis result would demonstrate that the bottom liquid phase is essentially a siloxane oligomer and the impurities are negligible in quantity.

EXAMPLE 5

A siloxane oligomer is prepared and analyzed in a same manner described in Example 4, except that tetraoctylphosphonium bromide (TOPB, available from Sigma Aldrich, St. Louis, Mo.) is used as the phase transfer catalyst instead of TBPB. The oligomer prepared after about 4 hours of reaction time has an expected weight average molecular weight of about 5030. The oligomer prepared after about 24 hours of reaction time has an expected weight average molecular weight of about 9463. The following spectra is expected to be obtained for the oligomer produced after about 24 hours of reaction time: $^1$H-NMR (400 MHz) δ (ppm): 0.736 (s, b, 2H, SiCH$_2$CH$_2$), 1.725 (s, b, 2H, SiCH$_2$CH$_2$CH$_2$), 2.530 (m, b, 1H, CHOCHH), 2.710 (m, b, 1H, CHOCHH), 3.079 (s, b, CHOCH$_2$), 3.287 (m, b, 1H, OCHHCHOCH$_2$), 3.483 (m, b, 2H, SiCH$_2$CH$_2$CH$_2$), 3.711 (m, b, 1H, OCHHCHOCH$_2$). This analysis result would demonstrate that the bottom liquid phase is essentially a siloxane oligomer and the impurities are negligible in quantity.

EXAMPLE 6

A siloxane oligomer is prepared and analyzed in a same manner described in Example 4, except that tricaprylylmethylammonium chloride (ALIQUAT® 336) is used as a phase transfer catalyst instead of TBPB. The oligomer prepared after about 4 hours of reaction has an expected weight average molecular weight of about 2752. The oligomer prepared after about 24 hours of reaction has an expected weight average molecular weight of about 4908. The following spectra is expected to be obtained for the oligomer produced after about 24 hours of reaction time: $^1$H-NMR (400 MHz) δ (ppm): 0.718 (s, b, 2H, SiCH$_2$CH$_2$), 1.705 (s, b, 2H, SiCH$_2$CH$_2$CH$_2$), 2.525 (m, b, 1H, CHOCHH), 2.700 (m, b, 1H, CHOCHH), 3.072 (s, b, CHOCH$_2$), 3.282 (s, b, 1H, OCHHCHOCH$_2$), 3.472 (m, b, 2H, SiCH$_2$CH$_2$CH$_2$), 3.707 (m, b, 1H, OCHHCHOCH$_2$). This analysis result would demonstrate that the bottom liquid phase is essentially a siloxane oligomer and the impurities are negligible in quantity.

EXAMPLE 7

In a 25-ml flask, 10 grams of GPTMOS, 2.31 grams of tetramethoxysilane (TMOS) (available from Gelest, Inc., Morrisville, Pa.), 2.03 grams of deionized water, 4.67 grams of isopropanol, and 0.05 grams of a phase transfer catalyst, ALIQUAT® 336, were mixed and reacted by heating at about 60° C. After about 4 hours, the mixture was cooled down to about 22° C. and the mixture formed two liquid phases. The bottom liquid phase was separated using a separatory funnel.

Figure 1:
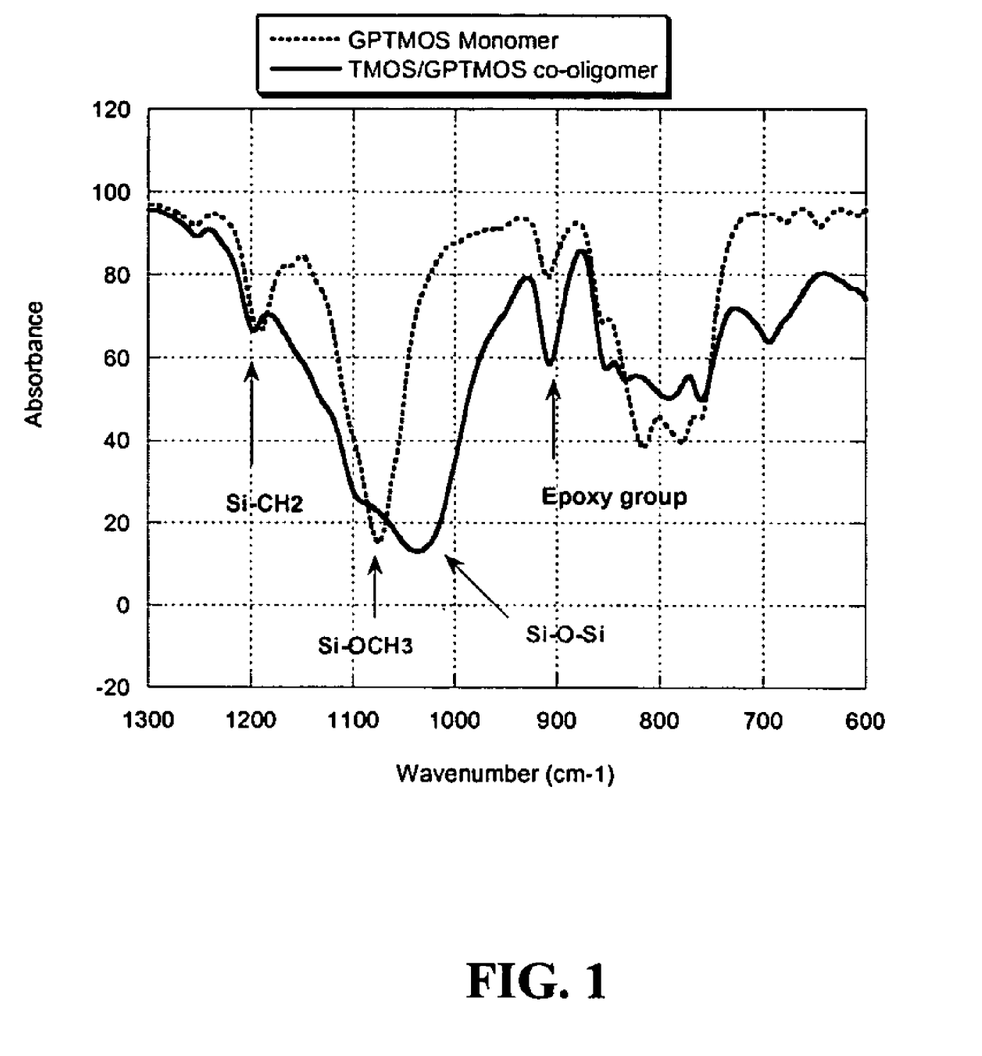
FIG. 1 is an FTIR spectra including (3-glycidoxypropyl) trimethoxysilane (GPTMOS) monomer and a tetramethoxysilane and (3-glycidoxypropyl)trimethoxysilane (TMOS/GPTMOS) co-oligomer.

The bottom liquid was then analyzed by an FTIR spectrometer, NEXUS 870 FT-IR spectrometer equipped with Avatar Smart Durasample IR accessory (manufactured by Nicolet Co., U.S.A.). FIG. 1 shows the resulting FTIR spectrum. The spectrum shows GPTMOS monomer: 1195 cm$^{-1}$, Si—CH$_2$; 1076 cm$^{-1}$, Si—OCH$_3$; 909 cm$^{-1}$, Epoxy group. TMOS/GPTMOS oligomer: 1198 cm$^{-1}$, Si—CH$_2$; 1037 cm$^{-1}$ (broad), Si—O—Si; 907 cm$^{-1}$, Epoxy group.

EXAMPLE 8

A siloxane oligomer is prepared and analyzed in a same manner described in Example 4, except that tetrabutylphosphonium chloride (TBPC, available from Sigma Aldrich, St. Louis, Mo.) is used as the phase transfer catalyst instead of TBPB. The oligomer prepared after about 4 hours of reaction time has an expected weight average molecular weight of about 7513. The oligomer prepared after about 24 hours of reaction time has an expected weight average molecular weight of about 8717. The following spectra is expected to be obtained for the oligomer produced after about 24 hours of reaction time: $^1$H-NMR (400 MHz) δ (ppm): 0.727 (s, b, 2H, SiCH$_2$CH$_2$), 1.721 (s, b, 2H, SiCH$_2$CH$_2$CH$_2$), 2.530 (m, b, 1H, CHOCHH), 2.710 (m, b, 1H, CHOCHH), 3.076 (s, b, CHOCH$_2$), 3.287 (m, b, 1H, OCHHCHOCH$_2$), 3.482 (m, b, 2H, SiCH$_2$CH$_2$CH$_2$), 3.711 (m, b, 1H, OCHHCHOCH$_2$). This analysis result would demonstrate that the bottom liquid phase is essentially a siloxane oligomer and the impurities are negligible in quantity.

EXAMPLE 9

An epoxy functionalized siloxane oligomer was prepared using the following procedure. The following components were added to a one liter flask: 750 grams of an alkoxysilane, (3-glycidoxypropyl)trimethoxysilane (GPTMOS) (available from Gelest Inc., Morrisville, Pa.); 197 grams of isopropanol; 85.7 grams of water; and 7.5 grams of a phase transfer catalyst, ALIQUAT® 336. After addition, the components were mixed together and stirred at room temperature for 16 hours. The mixture was then transferred to a separation funnel and kept in a refrigerator at 4° C. for 2 hours. The mixture formed two liquid phases and the bottom liquid phase was separated.

This liquid was then analyzed by a single pulse $^1$H-NMR (Nuclear Magnetic Resonance) spectroscopy, using model Eclipse 400+ (JEOL Corporation, Japan). Acetone d$_6$ was used as a solvent for this analysis. A summary of the spectra obtained was $^1$H-NMR (400 MHz) δ (ppm): 0.747 (s, b, 2H, SiCH$_2$CH$_2$), 1.728 (s, b, 2H, SiCH$_2$CH$_2$CH$_2$), 2.531 (m, b, 1H, CHOCHH), 2.700 (m, b, 1H, CHOCHH), 3.077 (s, b, CHOCH$_2$), 3.292 (m, b, 1H, OCHHCHOCH$_2$), 3.487 (m, b, 2H, SiCH$_2$CH$_2$CH$_2$), 3.709 (m, b, 1H, OCHHCHOCH$_2$). This analysis determined that the bottom liquid phase is essentially a siloxane oligomer. This siloxane oligomer contained essentially negligible amount of the phase transfer catalyst.

A GPC analysis determined that the epoxy functionalized oligomer had an average molecular weight of about 9489.

EXAMPLE 10

Two other oligomers were synthesized following the procedure of Example 9, except the reaction time, reaction temperature, and phase transfer catalyst were changed. Two epoxy siloxane oligomers were formed using the reaction conditions as shown in Table 1. The NMR analysis determined that the bottom liquid phases obtained in this example were essentially a siloxane oligomer. This siloxane oligomer contained essentially negligible amount of the phase transfer catalyst. The formed siloxane oligomers had weight average molecular weights as shown in Table 1.

TABLE 1

Siloxane oligomers

| Example | Reaction time | Reaction temperature | Phase Transfer Catalyst | Weight average molecular weight of oligomer |
|---------|---------------|----------------------|-------------------------|---------------------------------------------|
| 10A | 2 hour | 60° C. | Tricaprylylmethylammonium chloride (ALIQUAT ® 336) | 8029 |
| 10B | 3 hour | 60° C. | Tetrabutylphosphonium bromide (TBPB) | 7738 |

A number of embodiments of the invention have been described. Nevertheless, it will be understood that various modifications may be made without departing from the spirit and scope of the invention. Accordingly, other embodiments are within the scope of the following claims.

What is claimed is:

1. A process, comprising:
   forming a siloxane oligomer from a mixture comprising at least one alkoxysilane, at least one phase transfer catalyst, and water,
   wherein the at least one alkoxysilane has a general structure represented by formula (I):

$$(OFG)_x-Si-(OR)_{4-x} \qquad I$$

wherein x equals 1, 2 or 3;
   OR is a hydrolyzable alkoxy group;
   R is an alkyl group; and
   OFG is an organofunctional group that provides additional polymerizable functionality to the siloxane oligomer; and
   wherein the at least one phase transfer catalyst is selected from the group consisting of tetrabutylphosphonium bromide, tetrabutylphosphonium chloride, tetraoctylphosphonium bromide, and mixtures thereof.

2. The process of claim 1, wherein each R independently has from 1 to 20 carbon atoms.

3. The process of claim 1, wherein each R independently has from 1 to 4 carbon atoms.

4. The process of claim 1, wherein each OFG independently has from 1 to 100 carbon atoms.

5. The process of claim 1, wherein each OFG independently has from 1 to 20 carbon atoms.

6. The process of claim 1, wherein each OFG independently includes at least one functional group selected from the group consisting of epoxy, acrylate, methacrylate, amino, acetyl, cyano, halogen, mercapto, vinyl, alkoxyalkyl, carbamate, carboxyl, ester, aromatic, or alkyl (straight, branched, or cyclic) functional groups.

7. The process of claim 1, wherein each OFG has at least one carbon atom in addition to the at least one functional group.

8. The process of claim 1, wherein the at least one alkoxysilane is selected from the group consisting of (3-glycidoxypropyl)trimethoxysilane, 2-(3,4-epoxycyclohexyl)ethyltrimethoxysilane, 2-(3,4-epoxycyclohexyl)ethyltriethoxysilane, 5,6-epoxyhexyltriethoxysilane, (3-methacryloxypropyl)trimethoxysilane, (3-methacryloxypropyl)triethoxysilane, (3-acryloxypropyl) trimethoxysilane,3-aminopropyltrimethoxysilane, 3-aminopropyltriethoxysilane, acetoxypropyltrimethoxysilane, 3-cyanopropyltrimethoxysilane, (3,3,3-trifluoropropyl)trimethoxysilane, (tridecafluoro-1,1,2,2-tetrahydrooctyl)triethoxysilane, 3-mercaptopropyltrimethoxysilane, vinyltrimethoxysilane, vinyltriethoxysilane, and mixtures thereof.

9. The process of claim 1, wherein the at least one alkoxysilane is selected from the group consisting of (3-glycidoxypropyl)trimethoxysilane, 2-(3,4-epoxycyclohexyl)ethyltrimethoxysilane, 2-(3,4-epoxycyclohexyl)ethyltriethoxysilane, 5,6-epoxyhexyhriethoxysilane, (3-methacryloxypropyl)trimethoxysilane, (3-methaeryloxypropyl)triethoxysilane, (3-acryloxypropyl) trimethoxysilane, and mixtures thereof.

10. The process of claim 1, wherein the at least one alkoxysilane is selected from the group consisting of (3-glycidoxypropyl)trimethoxysilane, (3-methacryloxypropyl)trimethoxysilane, (3-methacryloxypropyl)triethoxysilane, and mixtures thereof.

11. The process of claim 1, wherein the at least one phase transfer catalyst is present in the mixture in an amount from about 0.001 grams per gram of the alkoxysilane to about 0.2 grams per gram of the alkoxysilane.

12. The process of claim 1, wherein water is present in the mixture in an amount from about 0.5 moles per mole of the alkoxysilane to about 20 moles per mole of the alkoxysilane.

13. The process of claim 1, wherein water is present in the mixture in an amount from about 0.5 moles per mole of the alkoxysilane to about 5 moles per mole of the alkoxysilane.

14. The process of claim 1, wherein the mixture further comprises a solvent.

15. The process of claim 14, wherein the solvent is selected from the group consisting of ethanol, isopropanol, 1-methoxy-2-propanol, ethyl acetate, n-butylacetate, t-butylacetate, 2-propoxyethanol, propylene glycol monomethyl ether acetate, and mixtures thereof.

16. The process of claim 14, wherein the solvent comprises isopropanol.

17. The process of claim 14, wherein the solvent is present in the mixture in an amount at least about 0.01 moles per mole of the alkoxysilane.

18. The process of claim 17, wherein the solvent is present in the mixture in an amount at least about 0.1 moles per mole of the alkoxysilane.

19. The process of claim 18, wherein the solvent is present in the mixture in an amount at least about 1 mole per mole of the alkoxysilane.

20. The process of claim 1, wherein forming a siloxane oligomer continues for a period sufficient to hydrolyze at least 40 percent of all OR groups.

21. The process of claim 1, wherein forming a siloxane oligomer continues for a period sufficient to hydrolyze at least 70 percent of all OR groups.

22. The process of claim 1, wherein forming a siloxane oligomer continues for a period sufficient to hydrolyze at least 80 percent of all OR groups.

23. The process of claim 1, wherein forming a siloxane oligomer continues for a period sufficient to form a siloxane oligomer with a weight average molecular weight from about 200 to about 100,000.

24. The process of claim 1, wherein forming a siloxane oligomer continues for a period sufficient to form a siloxane oligomer with a weight average molecular weight from about 1,000 to about 50,000.

25. The process of claim 1, wherein forming a siloxane oligomer continues for a period sufficient to form a siloxane oligomer with a weight average molecular weight from about 2,000 to about 20,000.

26. The process of claim 1, wherein forming a siloxane oligomer comprises heating the mixture at a temperature at or below the boiling point of the mixture at atmospheric pressure.

27. The process of claim 1, wherein forming a siloxane oligomer comprises heating the mixture at a temperature from about 10° C. to about 150° C.

28. The process of claim 1, wherein forming a siloxane oligomer comprises heating the mixture at a temperature from about 25° C. to about 80° C.

29. The process of claim 1, wherein forming a siloxane oligomer comprises heating the mixture at a temperature from about 50° C. to about 70 ° C.

30. The process of claim 1, further comprising purifying the siloxane oligomer.

31. The process of claim 30, wherein purifying the siloxane oligomer comprises separating a first liquid phase from a second liquid phase.

32. The process of claim 1, wherein the at least one phase transfer catalyst comprises tetrabutylphosphonium bromide.

33. The process of claim 1, wherein the at least one phase transfer catalyst comprises tetrabutylphosphonium chloride.

34. The process of claim 1, wherein the at least one phase transfer catalyst comprises tetraoctylphosphonium bromide.

35. A process comprising forming a siloxane oligomer from a mixture comprising:

at least one alkoxysilane;

at least one phase transfer catalyst selected from the group consisting of tricaprylylmethylammonium chloride, methyl tributyl ammonium chloride, tetrabutyl ammonium bromide, tetrabutyl ammonium hydrogen sulfate, triethyl benzyl ammonium chloride, tetrabutyl phosphonium bromide, tetrabutyl phosnhonium chloride, tetraoctylphosphonium bromide, and mixtures thereof; and water, wherein the at least one alkoxysilane has a general structure represented by formula (I):

$$(OFG)_x-Si-(OR)_{4-x} \quad \text{I}$$

wherein x equals 1, 2 or 3;

OR is a hydrolyzable alkoxy group;

R is an alkyl group; and

OFG is an organofunctional group that provides additional polymerizable functionality to the siloxane oligomer; and wherein at least one organofunctional group comprises an amino-, cyano-, mercapto-, or acetyl-functional group.

36. The process of claim 35, wherein at least one organofunctional group comprises an amino-functional group.

37. The process of claim 35, wherein at least one organofunctional group comprises a cyano-functional group.

38. The process of claim 35, wherein at least one organofunctional group comprises a mercapto-functional group.

39. The process of claim 35, wherein at least one organofunctional group comprises an acetyl-functional group.

* * * * *

UNITED STATES PATENT AND TRADEMARK OFFICE
CERTIFICATE OF CORRECTION

PATENT NO. : 7,329,716 B2  Page 1 of 1
APPLICATION NO. : 11/108502
DATED : February 12, 2008
INVENTOR(S) : Hailiang Wang, Zhibang Jim Duan and Satyabrata Raychaudhuri It is certified that error appears in the above-identified patent and that said Letters Patent is hereby corrected as shown below:

Column 15, line 10, please delete "epoxyhexyhriethoxysilane" and insert --epoxyhexyltriethoxysilane-- therefor;

Column 15, line 11, please delete "methaerylox" and insert --methacrylox-- therefor;

Column 16, line 35, please delete "phosnhonium" and insert --phosphonium-- therefor.

Signed and Sealed this

Twenty-sixth Day of August, 2008

JON W. DUDAS
*Director of the United States Patent and Trademark Office*